US012743077B2

(12) United States Patent
Chabeauti et al.

(10) Patent No.: US 12,743,077 B2
(45) Date of Patent: Sep. 22, 2026

(54) METHOD FOR ESTIMATING A RESIDUAL STRESS FIELD IN A WORKPIECE DURING MACHINING AND MACHINING PROCESS USING SAID METHOD

(71) Applicant: Airbus Operations SAS, Toulouse (FR)

(72) Inventors: Hugo Chabeauti, Toulouse (FR); Mathieu Ritou, Carquefou (FR); Guenael Germain, Angers (FR); Frédéric Ortmans, Toulouse (FR); Bruno Lavisse, Angers (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 465 days.

(21) Appl. No.: 18/460,921

(22) Filed: Sep. 5, 2023

(65) Prior Publication Data

US 2024/0111277 A1 Apr. 4, 2024

(30) Foreign Application Priority Data

Sep. 30, 2022 (FR) ....................................... 2209972

(51) Int. Cl.
*G05B 19/418* (2006.01)

(52) U.S. Cl.
CPC ... *G05B 19/41875* (2013.01); *G05B 19/4183* (2013.01); *G05B 19/41885* (2013.01)

(58) Field of Classification Search
CPC .......... G05B 19/4183; G05B 19/41875; G05B 19/41885; G05B 2219/32193;

(Continued)

(56) References Cited

U.S. PATENT DOCUMENTS 6,470,756 B1 * 10/2002 Prime ...................... G01N 3/00 73/804
2010/0305910 A1 * 12/2010 Yilbas .................... B23K 26/38 703/2

(Continued)

FOREIGN PATENT DOCUMENTS

CN 113191050 B * 2/2024 ............. G06F 30/23

OTHER PUBLICATIONS

Yue et al., Analytical Prediction of Residual Stress in the Machined Surface during Milling, Apr. 9, 2020, Key Laboratory of Advanced Manufacturing and Intelligent Technology, Ministry of Education, Harbin University of Science and Technology et al., p. 1-20. (Year: 2020).*

(Continued)

*Primary Examiner* — Kidest Worku
(74) *Attorney, Agent, or Firm* — Greer, Burns & Crain, Ltd.

(57) ABSTRACT

A method for estimating a residual stress field in a workpiece. The method includes measuring geometric parameters of the workpiece during machining at which a residual stress field is to be known to determine a geometric profile of said workpiece, estimating, from the geometric profile and an estimation model, subsequent deformations that the workpiece is liable to undergo during further machining, said estimation model being trained by machine learning on training workpieces to use the geometric profile of the workpiece and prerecorded data on the training workpieces to estimate said subsequent deformations of the workpiece, and estimating from the subsequent deformations and a simulation model, the residual stress field in the workpiece, said simulation model being a generic physical model based on simulations defining a variability of the residual stress (Continued)

field in the workpiece as a function of manufacturing parameters of the raw workpiece.

18 Claims, 4 Drawing Sheets

(58) Field of Classification Search
CPC ........... G05B 2219/32194; G05B 2219/32216; G06F 30/23; G06F 30/27
See application file for complete search history.

(56) References Cited

U.S. PATENT DOCUMENTS

| | | | | |
|---|---|---|---|---|
| 2013/0091955 | A1* | 4/2013 | Sim | G01L 5/0047 73/783 |
| 2015/0356402 | A1* | 12/2015 | Wang | G06N 3/08 706/21 |
| 2018/0095450 | A1* | 4/2018 | Lappas | B33Y 10/00 |
| 2022/0197246 | A1 | 6/2022 | Cella et al. | |

OTHER PUBLICATIONS

Siebenaler et al., Prediction of workpiece deformation in a fixture system using the finite element method,May 23, 2005; The George W. Woodruff School of Mechanical Engineering, Georgia Institute of Technology, p. 51-58. (Year: 2005).*
H. Chabeauti et al., "Digital Twin of Forged Part to Reduce Distortion in Machining" CIRP Annals—Manufacturing Technology, 2023.
French Search Report for corresponding French Patent Application No. 2209972 dated May 16, 2023.
Z. Zhao et al., "On-line Part Deformation Prediction Based on Deep Learning" Journal of Intelligent Manufacturing, Springer US, New York, vol. 31, No. 3, Feb. 14, 2019, pp. 561-574.
Z. Zhu et al., "Digital Twin-Driven Machining Process for Thin-Walled Part Manufacturing" Journal of Manufacturing Systems, Society of Manufacturing Engineers, Dearborn, MI (USA), vol. 59, Mar. 31, 2021, pp. 453-466.
A. E. Rodriguez-Sanchez et al., "Part-Distortion Optimization of Aluminum-Based Aircraft Structures Using Finite Element Modeling and Artificial Neural Networks" CIRP Journal of Manufacturing Science and Technology, Elsevier, Amsterdam, NL, vol. 31, Sep. 3, 2020, pp. 595-606 (Abstract Only).

* cited by examiner

METHOD FOR ESTIMATING A RESIDUAL STRESS FIELD IN A WORKPIECE DURING MACHINING AND MACHINING PROCESS USING SAID METHOD

CROSS-REFERENCES TO RELATED APPLICATIONS

This application claims the benefit of French Patent Application Number 2209972 filed on Sep. 30, 2022, the entire disclosure of which is incorporated herein by way of reference.

FIELD OF THE INVENTION

The present invention concerns a method for estimating a residual stress field in a workpiece during machining, in particular for an aircraft part, and a machining process using said method.

BACKGROUND OF THE INVENTION

It is known that some manufacturing processes induce residual stresses in the parts manufactured, namely mechanical stresses that are present in a part when the latter is in equilibrium with no external load. These residual stresses can cause significant deformation of the finished parts. Consequently, parts deformed in this way are sometimes unusable as such, in particular in the context of assemblies, and necessitate rectification operations that are sometimes lengthy and costly.

A situation of this kind can arise in particular in the aeronautical sector, in which large metal workpieces are machined, generally with great pass depths and from raw plates or sheets or raw forged workpieces. These conditions are particularly favorable to the generation of residual stresses with high variability and therefore to the appearance of deformations that are difficult to predict.

One solution for avoiding the generation of residual stresses consists in introducing stress relief (or release) during machining, for example by unclamping the workpieces between machining steps. The effect of this stress relief is to reduce the final deformations and to absorb their variability. However, to be really effective this solution necessitates the use of a large number of machining steps with small pass depths, which considerably increases machining time and therefore manufacturing cost. Moreover, it also necessitates dedicated tooling that can be heavy and costly to use.

Another solution would be to measure the residual stresses in the machined workpieces in order to adapt machining accordingly. However, the usual measurement methods cannot be applied in an industrial context because they are either destructive or very costly and sometimes even impossible to employ because there are parameters that cannot be measured.

This situation is therefore not entirely satisfactory.

SUMMARY OF THE INVENTION

The present invention has for an object proposing a solution for remedying the aforementioned disadvantages. It concerns a method for estimating a residual stress field in a workpiece during machining, said workpiece being obtained from a raw workpiece.

According to the invention a method may include at least the following steps executed successively:

- a measurement step consisting in measuring geometric parameters of the workpiece at a given moment during machining thereof at which the residual stress field in said workpiece needs to be known, in such a manner as to determine a geometric profile of said workpiece;
- a first estimation step consisting in estimating from the geometric profile and an estimation model subsequent deformations that the workpiece is liable to undergo during further machining, said estimation model being trained beforehand by machine learning on so-called training workpieces in such a manner as to be able to use the geometric profile of the workpiece and prerecorded data on the training workpieces to estimate said subsequent deformations of the workpiece; and
- a second estimation step consisting in estimating from the subsequent deformations estimated during the first estimation step and a simulation model the residual stress field in the workpiece, said simulation model being a generic physical model based on simulations defining a variability of the residual stress field in the workpiece as a function of manufacturing parameters of the raw workpiece.

Thus the invention makes it possible to estimate the residual stress field in the workpiece during machining without recourse to direct measurement of said residual stresses. It makes it possible in particular to estimate the residual stress field at a very early stage during machining of the workpiece. It is then possible to anticipate the behavior of said workpiece during further machining and to adjust said machining as specified hereinafter.

The method is simple and rapid to use and of relatively low cost. Moreover, the method can be easily integrated into a machining process with the aim of producing residual stress field estimates in real time on workpieces during machining as specified hereinafter.

In the measurement step principal component analysis is advantageously applied to the measured geometric parameters in such a manner as to reduce the dimension of the geometric profile of the workpiece to be determined.

Moreover, the estimation model is advantageously trained using a regression method enabling estimation of the deformations on the basis of data measured on the training workpieces.

Moreover, the geometric profile of the workpiece determined in the measurement step is advantageously used to enrich the estimation model.

Moreover, the simulation model of the residual stress field is advantageously based on finite element simulations and is constructed with the aid of singular value decomposition.

In a preferred embodiment the simulation model is adapted to define a variability of the residual stress field in the workpiece based on manufacturing parameters of the raw workpiece, said raw workpiece having undergone at least one of the following manufacturing operations: forging, heat treatment, cold rolling, machining.

The present invention also concerns a process for machining a raw workpiece to produce a finished workpiece.

According to the invention said machining process comprises the following steps executed successively:

- an initial measurement step including measuring geometric parameters of said raw workpiece;
- an initial machining step including in carrying out at least one initial machining operation on the raw workpiece in such a manner as to obtain a first intermediate workpiece;
- at least one series of steps comprising at least the following steps executed successively:

a first processing step including estimating a residual stress field in the first intermediate workpiece using the method for estimating a residual stress field described hereinabove;

- a second processing step including estimating from the residual stress field in the first intermediate workpiece estimated in the first processing step a subsequent mechanical behavior of said first intermediate workpiece during subsequent machining operations;
- a correction step including modifying the value of at least one machining parameter of said subsequent machining operations as a function of the subsequent mechanical behavior of the first intermediate workpiece estimated in the second processing step with the aim of minimizing deformations of the first intermediate workpiece during said subsequent machining operations; and
- a machining step including carrying out at least one machining operation on the first intermediate workpiece, said machining operation taking into account said modified value of said machining parameter(s) in such a manner as to obtain a second intermediate workpiece.

In a preferred first embodiment of the process the second intermediate workpiece obtained in the machining step is the finished workpiece to be produced.

In a second embodiment said series of steps is carried out in an iterative manner and on each iteration the first intermediate workpiece is the second intermediate workpiece of the preceding iteration, said series of steps being repeated until the second intermediate workpiece is the finished workpiece to be produced.

Moreover, in one preferred embodiment the initial machining step comprises a single initial machining operation.

Moreover, the machining parameter or parameters advantageously include(s) at least one of the following parameters:

- a position of at least one machining tool;
- an orientation of the machining tool or tools;
- a position of the first intermediate workpiece to be machined;
- an orientation of the first intermediate workpiece to be machined;
- a trajectory of the machining tool or tools;
- a pass depth of the machining tool or tools;
- a cutting speed of the machining tool or tools.

Moreover, in the initial measurement step the geometric parameters are advantageously measured with the aid of at least one of the following measuring tools: a three-dimensional measuring machine, a three-dimensional scanner.

BRIEF DESCRIPTION OF THE DRAWINGS

The appended figures will clearly explain how the invention may be reduced to practice. In those figures identical references denote similar elements.

DETAILED DESCRIPTION OF THE PREFERRED EMBODIMENTS

The method M illustrating the invention and represented schematically in one particular embodiment in FIG. 1 makes it possible to estimate a residual stress field RS in a workpiece 1 as specified hereinafter.

The method M is more particularly intended to be used during machining of the workpiece 1, preferably as soon as possible, in order to determine the residual stress field RS in said workpiece 1 that is being machined. This knowledge at an early stage of machining makes it possible to adjust machining in such a manner as to minimize the deformations that the workpiece 1 will undergo during the remainder of machining. One such application is described hereinafter.

By "residual stresses" is meant auto-balanced static multiaxial stresses existing in an isolated workpiece at uniform temperature and in the absence of any external load. The expression "residual stress field" refers to the residual stresses and to their distribution in the workpiece.

Moreover, in the context of the present invention reference will be made to actions (measurements, estimations, . . . ) carried out "during machining". These expressions mean that said actions may be carried out at any time during machining a workpiece, namely from the beginning of its machining to its complete machining. In particular, these actions may be carried out between the various machining steps of said machining method (when the workpiece is not being machined).

Figure 3:
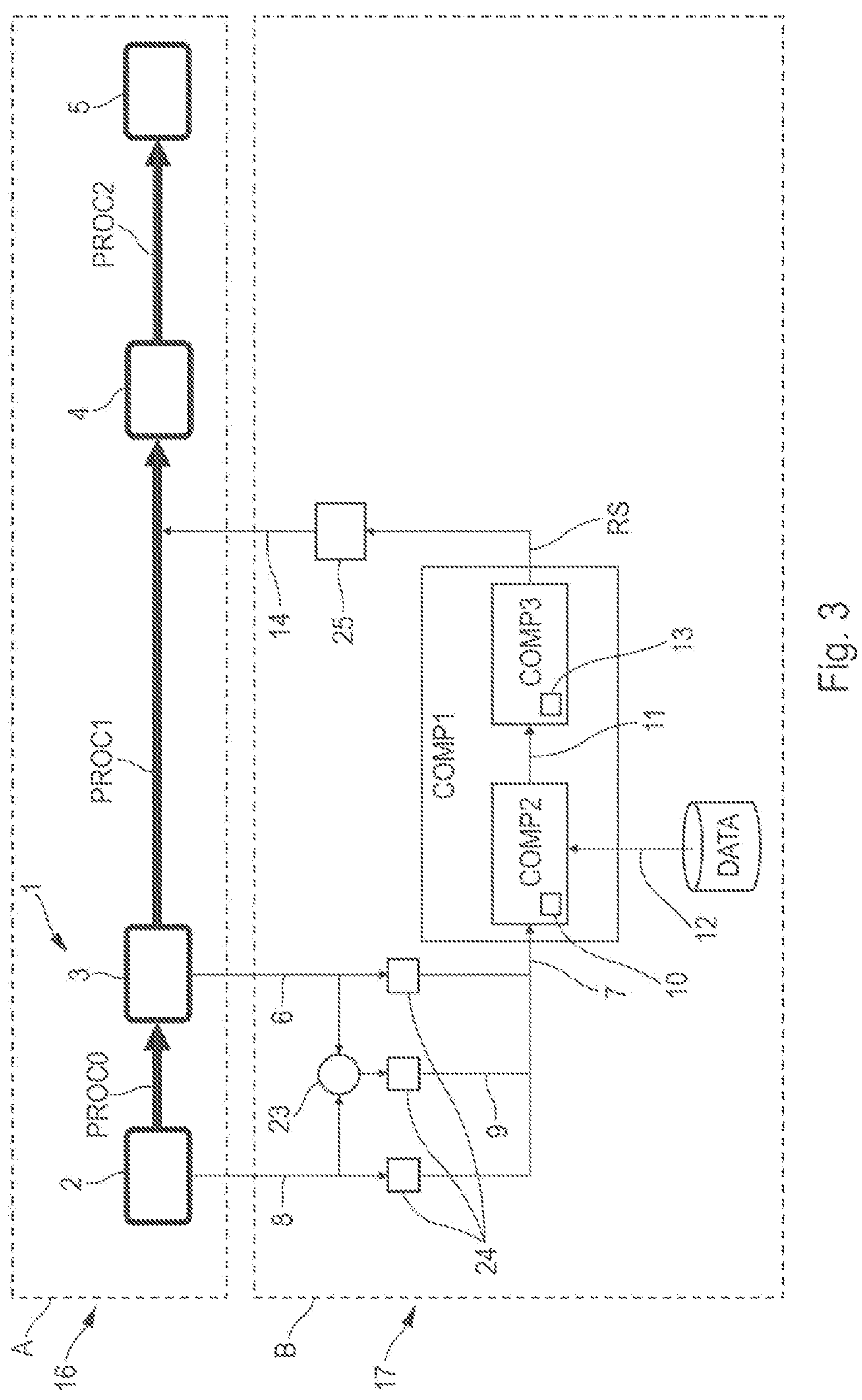
FIG. 3 is a schematic view of a machining system employing the machining process from FIG. 2.

In a preferred embodiment the method M may be implemented at least in part in software by a computation unit COMP1 of the usual kind as represented in FIG. 3 illustrating one example of application. This example shows schematically a preferred application of the method M during machining the workpiece 1 to be described in more detail in the remainder of the description.

The workpiece 1 may be a workpiece of varied size and/or of varied shape. It is preferably a large workpiece in the form of a beam, namely a workpiece one dimension of which is large compared to its other dimensions. The workpiece 1 is produced from a raw workpiece 2 obtained by usual manufacturing methods. The raw workpiece 2 is preferably a forged workpiece.

Moreover, the workpiece 1 is a workpiece considered at a given moment during machining, for example a workpiece after a given preforming step or after a given finishing step. The method M is preferably executed as soon as possible during machining.

Moreover, the workpiece 1 may be made from various metals, for example aluminum, steel or titanium.

Figure 1:
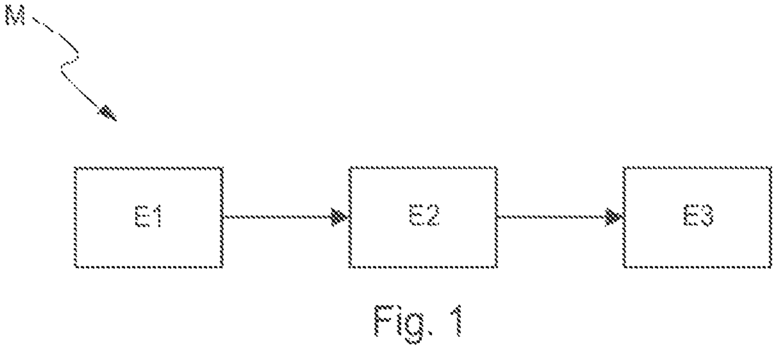
FIG. 1 is a block diagram of one embodiment of a method for estimating a residual stress field.

In the preferred embodiment represented in FIG. 1 the method M comprises the following steps executed successively: a measurement step E1, a first estimation step E2 and a second estimation step E3.

The measurement step E1 consists in measuring geometric parameters 6 (FIG. 3) of the workpiece 1 at a given moment during machining thereof, at which given moment the residual stress field RS needs to be known. The geometric parameters 6 measured may be measurements of positions of points on the workpiece 1 that determine the dimensions of said workpiece 1. The geometric parameters 6 measured in this way make it possible to determine a geometric profile 7 of the workpiece 1.

That geometric profile 7 may have dimensions measured on the workpiece 1 at the given moment as well as other data. For example, it may include other geometric parameters of the workpiece 1 measured during earlier machining steps or deformations 9 that said workpiece 1 has undergone during previous machining steps. These deformations 9 may be caused by residual stresses in the workpiece 1 and may be manifested in various forms, so for example the workpiece 1 may be twisted or bent, in particular in the case of workpieces of elongate shape.

The estimation step E2 that follows the measurement step E1 consists in estimating subsequent deformations 11 that the workpiece 1 is liable to undergo during the remainder of its machining using an estimation model 10 (FIG. 3) and taking into account the geometric profile 7 determined during the measurement step E1. The estimation model 10 is a numerical model that may be implemented in software by a computation unit COMP2 of the usual microprocessor type.

The estimation model 10 is first trained by machine learning on so-called training parts. For example, the estimation model 10 may be trained with the aid of artificial intelligence taking into account prerecorded data 12 obtained from training workpieces. In a manner that is not limiting on the invention this prerecorded data 12 includes at least geometric parameters measured on said training workpieces. Moreover, the prerecorded data 12 may be stored in a database DATA as represented in the FIG. 3 application example.

The training workpieces are preferably workpieces similar to the workpiece 1 that are machined by a machining process similar to that for machining the workpiece 1. By "similar workpieces" is meant workpieces with the same dimensions, made of the same material, having the same mechanical characteristics and obtained from similar raw workpieces (namely raw workpieces obtained by the same manufacturing method). By "similar machining" is meant a machining method comprising the same machining steps with the same machining parameters. The estimation model 10 is preferably trained using data obtained from training workpieces machined on the same machine or machines used to machine the workpiece 1.

The estimation model 10 is trained in such a manner as to be able to use the geometric profile 7 of the workpiece 1 and the prerecorded data 12 in the database DATA to estimate the subsequent deformations 11 of the workpiece 1.

Moreover, the step E3 of estimating a residual stress field RS in the workpiece 1 uses a simulation model 13 taking into account the subsequent deformations 11 estimated in the estimation step E2.

The simulation model 13 is a generic physical model based on thermomechanical simulations. These may in particular be finite element numerical simulations. Moreover, the simulation model 13 is a mathematical model that can be implemented in software by a computation unit COMP3 of the usual microprocessor type.

The simulation model 13 is more particularly based on theoretical calculations of the potential residual stresses in the workpiece 1. These theoretical calculations are based on knowledge of the raw workpiece 2, more precisely concerning its manufacture and its geometry. In fact, it is possible to calculate residual stresses potentially induced by each of said manufacturing steps knowing the parameters of the various manufacturing steps and the geometry of the raw workpiece 2. By way of non-exhaustive example, those parameters may include values of particular dimensions of the raw workpiece 2, of the dimension differences between certain parts of the raw workpiece 2, of forces or of pressures linked to operations in the manufacture of the raw workpiece 2 (compression, machining, . . . ), error values relating to said manufacturing operations or temperature values in the case of heat treatment.

The simulation model 13 is able to define a residual stress field variability in the workpiece 1 as a function of these parameters linked to the manufacture of the raw workpiece 2. By correlating this variability information with the subsequent deformations 11 of the workpiece 1 estimated during the estimation step E2 it is possible to estimate the residual stress field RS in the workpiece 1.

In a preferred embodiment the simulation model 13 is a so-called reduced model, namely an approximation of the thermomechanical simulations enabling an equivalent result to be obtained with the computation time greatly reduced. The simulation model 13 may be reduced using the usual mathematical methods. For example, it may be constructed using single value decomposition.

The method M therefore makes it possible to estimate the residual stress field RS in the workpiece 1 during machining without recourse to direct calculation of said residual stresses. In particular it makes it possible to estimate the residual stress field RS at a very early stage of machining the workpiece 1. It is then possible to anticipate the behavior of said workpiece 1 during further machining and to adjust said machining as specified hereinafter. The method M is simple and rapid to use and of relatively low cost. Moreover, it can easily be integrated into a machining process with the aim of producing residual stress field estimates in real time on workpieces during machining thereof.

In one particular embodiment the measurement step E1 includes data processing applied to the measurements of parameters carried out on the workpiece 1. In fact, in some cases statistical bias may exist, for example when the number of measurements effected is large compared to the number of workpieces the parameters of which are measured and/or the parameters measured have a strong correlation between them. It may therefore be beneficial to take into account only parameters that have a significant effect on what is to be studied by processing the data.

Thus in this particular embodiment principal component analysis is applied to the geometric parameters measured on the workpiece 1. An upward variable selection may equally be applied. These ways of processing data make it possible to reduce the size of the geometric profile of the workpiece 1 that has been determined, in such a manner as to use only pertinent data to estimate the subsequent deformations 11 of the workpiece 1 and thus to limit the computation time.

Moreover, in one particular embodiment the estimation model 10 is trained using a regression method making it possible to estimate deformations on the basis of data measured on the training workpieces. For example, this may be a Ridge regression method. Compared to classic linear regression, Ridge regression makes it possible to reduce the risk of overloading with data machine learning by the estimation model 10. It therefore makes it possible to improve machine learning performance, in particular in the presence of noise. However, other regression methods may be preferred, depending on the application concerned. In a manner that is not limiting on the invention this may entail a method using Lasso regression, neural networks, decision trees, a k-nearest neighbor (k-NN) algorithm.

In one particular embodiment the geometric profile 7 of the workpiece 1 determined in the measurement step E1 is used to enrich the estimation model 10. In fact, it may be beneficial to continue training the estimation model 10 beyond the training workpieces alone. Also, in this particular embodiment the geometric profile 7 of the workpiece 1 determined in the measurement step E1 is stored in the database DATA and added to the prerecorded data 12. Machine learning can then be used taking into account the new data added to the database DATA.

This particular embodiment enables slight further refinement of the estimation model 10 each time that the method M is executed, which makes it possible to increase its accuracy so as to correspond as closely as possible to reality. It is particularly beneficial in the context of applications with a reduced number of training workpieces, for example for machining workpieces in small production runs or complex and/or costly workpieces.

Moreover, in a manner that is not limiting on the invention the simulation model 13 is adapted to define a variability of the residual stress field in the workpiece 1 for a raw workpiece 2 obtained using at least one of the following manufacturing processes: forging, heat treatment, cold rolling, machining. The raw workpiece 2 may in particular be obtained using a combination of those manufacturing processes.

The method M described hereinabove is particularly suited to use in a machining process for which a knowledge of the residual stress field RS in the workpiece 1 during machining is important.

Figure 2:
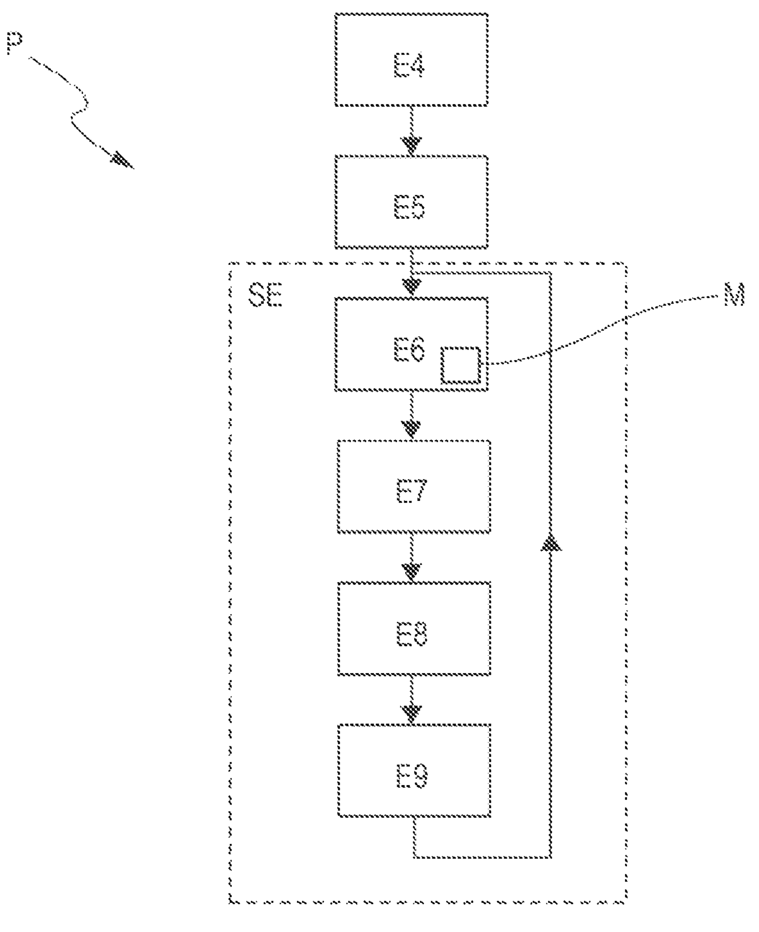
FIG. 2 is a block diagram of a preferred embodiment of a machining process utilizing the method from FIG. 1.

A machining process P using the method M is represented schematically in FIG. 2. Moreover, applications of this process P are represented by way of example from FIG. 3 to FIG. 5.

This refers to a machining process P which, starting from a raw workpiece 2, enables a finished workpiece 5 to be produced via one or more states referred to hereinafter as "intermediate workpieces". The workpiece 1 machined by the method M is the intermediate workpiece to which said method M is applied.

The process P comprises the following steps executed successively:

- an initial measurement step E4 of measuring geometric parameters 8 of the raw workpiece 2;
- an initial machining step E5 of carrying out at least one machining operation PROC0 (PROC is short for processing) on the raw workpiece 2 in such a manner as to obtain a first intermediate workpiece 3; and
- at least one series SE of steps enabling the finished workpiece 5 to be obtained, comprising the following steps executed successively:

a processing step E6 of estimating a residual stress field RS in the intermediate workpiece 3 using the method M described above, the intermediate workpiece 3 being the workpiece 1;

- a processing step E7 of estimating, from the residual stress field RS in the intermediate workpiece 3 estimated in the processing step E6, a subsequent mechanical behavior of said first intermediate workpiece 3 during subsequent machining operations;
- a correction step E8 of modifying the value of at least one machining parameter 14 of said subsequent machining operations as a function of the subsequent mechanical behavior of the intermediate workpiece 3 estimated in the processing step E7. This modification aims to minimize deformations of the intermediate workpiece 3 during said subsequent machining operations; and
- a machining step E9 of carrying out a machining operation PROC1, PROC2 on the intermediate workpiece 3. This machining operation PROC1, PROC2 taking into account the modified value of the machining parameter 14 in such a manner as to obtain a second intermediate workpiece 4.

Depending on the embodiment, the series SE of steps may be executed in such a manner as to obtain the finished workpiece 5 directly or executed more than once to obtain the finished workpiece 5.

In a preferred embodiment, the intermediate workpiece 4 obtained in the machining step E9 is the finished workpiece 5 to be produced.

However, in one particular embodiment the series SE of steps of the process P is carried out in an iterative manner. In each iteration the intermediate workpiece 3 is the intermediate workpiece 4 of the preceding iteration. The series SE of steps is therefore repeated until the intermediate workpiece 4 is the finished workpiece 5 to be produced.

In the application example represented in FIG. 3 the process P includes two iterations of the series of steps SE. However, it may include more than two iterations. Moreover, the method M may be used in each iteration or in only some of them.

The process P can therefore be used to estimate the residual stress field RS in the intermediate workpiece 3 between the machining operations PROC1, PROC2. The evolution of the residual stress field RS in the intermediate workpiece 3 can then be taken into account at any moment during machining. Moreover, the machining parameter or parameters 14 may be adjusted accordingly and in real time. This makes it possible in particular to minimize the deformations caused by the residual stresses in a manner customized for each machined workpiece.

In a preferred embodiment the initial machining step E5 includes only one machining operation PROC0. Thus the method M is executed directly after a single machining operation on the raw workpiece 2. This makes it possible to estimate the residual stress field RS very early in the process P and consequently to correct the machining parameter or parameters 14 effectively. This estimation of the residual stresses at an early stage of the process P is particularly suited to machining involving a reduced number of machining operations.

In a manner that is not limiting on the invention the machining parameters 14 that can be corrected during execution of the process P may include the following parameters:

- a position of a machining tool 15;
- an orientation of the machining tool 15;
- a position of the intermediate workpiece 3;
- an orientation of the intermediate workpiece 3;
- a trajectory of the machining tool 15;
- a pass depth of the machining tool 15;
- a feed speed of the machining tool 15;
- a cutting speed of the machining tool 15.

The machining parameters 14 to be corrected depend on the machining process concerned. This may mean a single machining parameter or a plurality of machining parameters. Likewise, the machining parameters 14 to be corrected may concern a single machining tool or a plurality of machining tools.

Moreover, the machining parameters 14 may be corrected automatically by a processing unit provided for this purpose or manually, for example by an operator.

Moreover, in the initial measurement step E4 and in the measurement step E1 the geometric parameters 8 of the raw workpiece 2 and the geometric parameters 6 of the intermediate workpiece 3 may be measured with the aid of the usual measurement tools. In a manner that is not limiting on the invention said geometric parameters 8 and 6 may be measured by a three-dimensional measurement machine or a 3D scanner.

Figure 4:
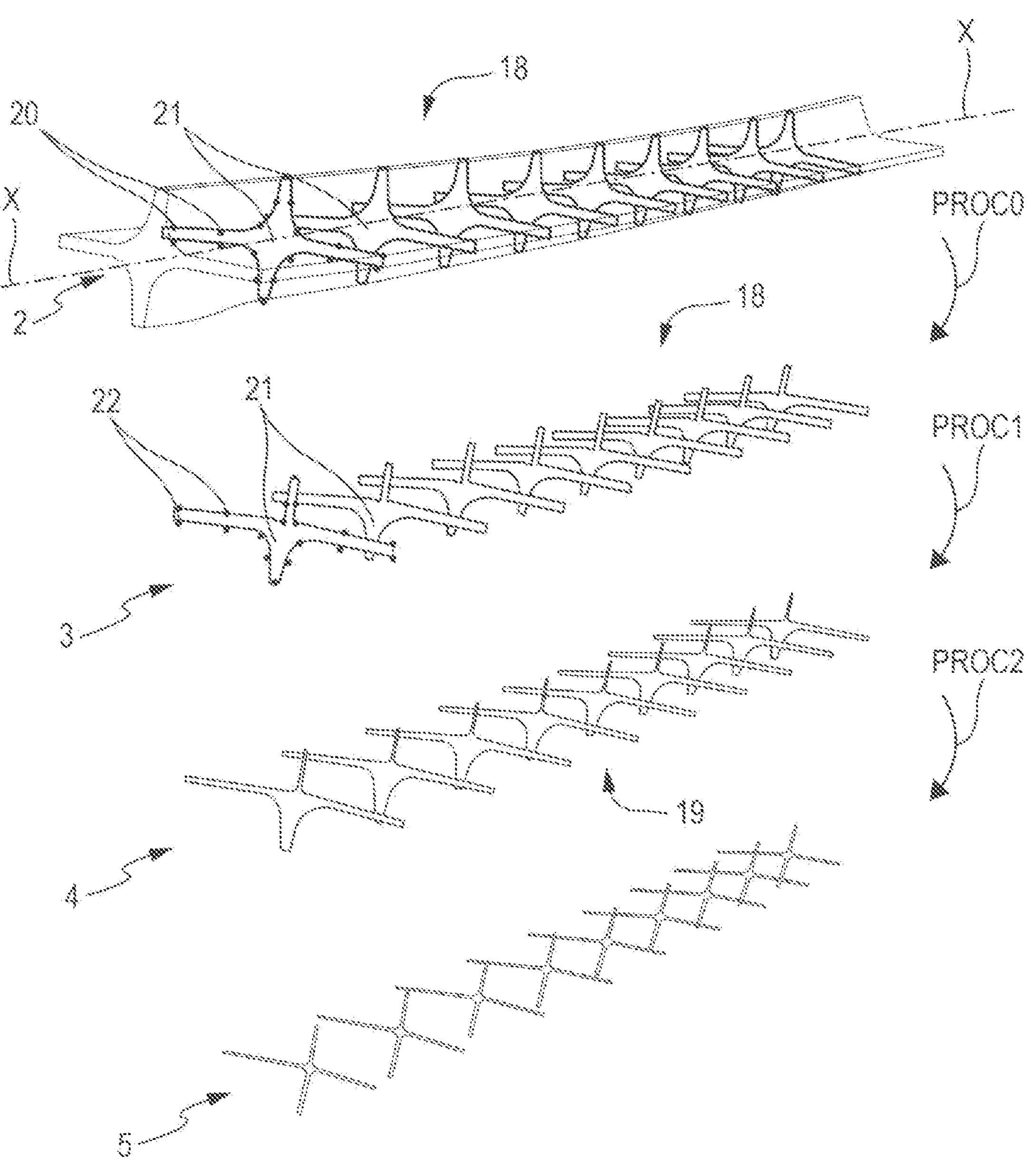
FIG. 4 is a schematic view of a workpiece machined with the aid of the machining system from FIG. 3 at various stages of machining it.
Figure 5:
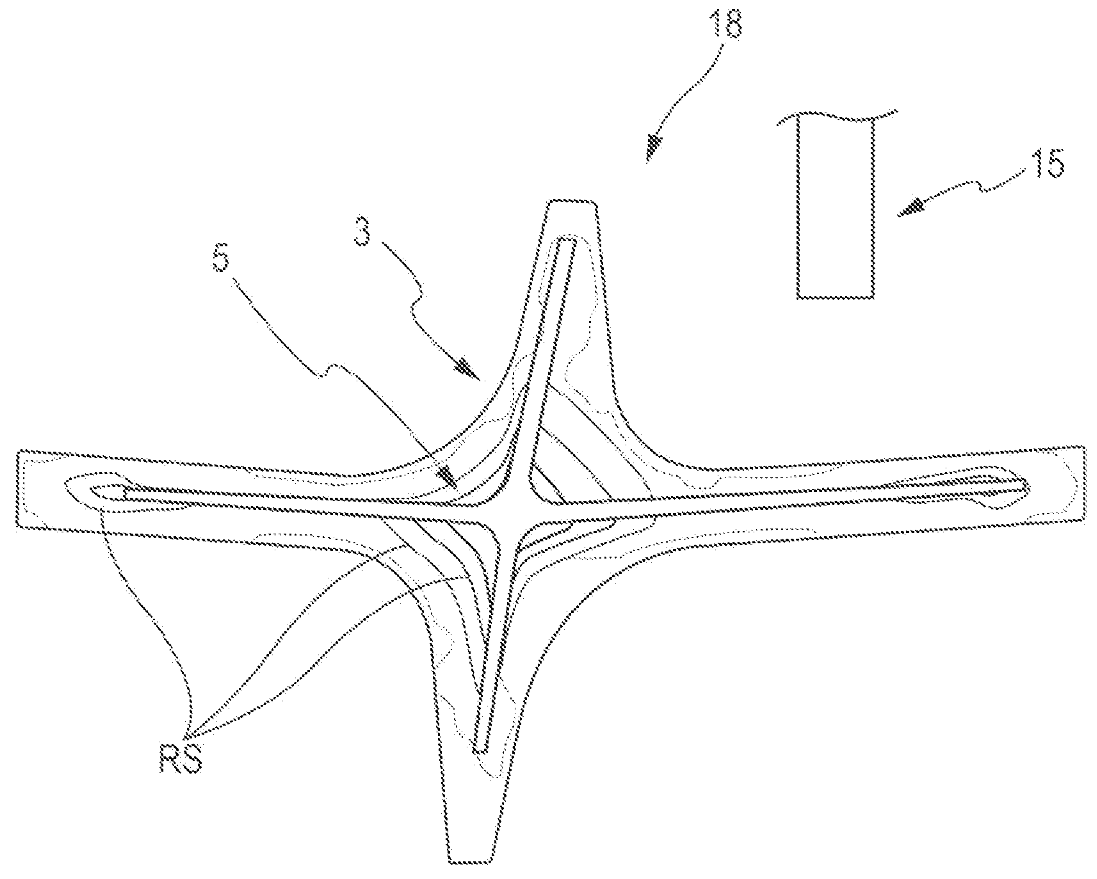
FIG. 5 is a view in section of the machined workpiece from FIG. 4 with a schematic representation of an estimated residual stress field.

For example, an application of the process P using the method M is represented schematically from FIG. 3 to FIG. 5. This application concerns the use of an embodiment of the process P in which machining the raw workpiece 2 enables the finished workpiece 5 to be obtained. This refers to machining an aeronautical workpiece that is referred to as a "cross" in the remainder of the description. The cross has a straight elongate shape with a cruciform cross section, as depicted in FIG. 4 and FIG. 5.

The raw workpiece 2 is a forged workpiece having roughly the shape of the cross. The finished workpiece 5 is the cross that it is wished to produce using the process P. Views of the cross at various stages of its machining are represented in FIG. 4, in particular with a view of the raw workpiece 2. In the other views in FIG. 4 only sections of the cross are represented.

As represented schematically in FIG. 3 the machining carried out by the process P is carried out by a usual machining system including in particular a machining part 16, depicted by a frame A, and a processing part 17, depicted by a frame B.

The machining part 16 is adapted to execute the machining operations PROC0, PROC1 and PROC2 represented schematically by the bold arrows in FIG. 3 and FIG. 4. These machining operations PROC0, PROC1 and PROC2 are the usual material removal operations. To be more specific, the raw workpiece 2 undergoes first of all the machining operation PROC0 corresponding to a first removal of material over an upper part 18 of the cross to obtain the intermediate part 3. The intermediate part 3 then undergoes the machining operation PROC1 consisting of a second removal of material in the upper part 18 of the cross to obtain the intermediate workpiece 4. The intermediate workpiece 4 finally undergoes the machining operation PROC2 corresponding to a removal of material over a lower part 19 of the cross to obtain the finished workpiece 5.

Moreover, the processing part 17 includes the computation unit COMP1 adapted to execute the method M between the machining operation PROC0 and the machining operation PROC1. In fact, once the machining operation PROC0 has been completed and the intermediate workpiece 3 obtained, what is required is to estimate the residual stress field RS in said intermediate workpiece 3 in order to adjust further machining accordingly.

Thus, prior to the machining operation PROC0, the geometric parameters 8 are measured on the raw workpiece 2. This measurement step consists in palpating points 20 at a plurality of locations on said raw workpiece 2. To be more specific, the points 20 are palpated on perimeters of the raw workpiece 2 at the level of a plurality of cross sections 21 in a longitudinal direction of the cross represented by an axis X-X in FIG. 4. Only the points 20 of the first section 21 are represented in FIG. 4.

Once the machining operation PROC0 has been completed the geometric parameters 6 are measured on the intermediate workpiece 3. This measurement step consists in palpating points 22 at a plurality of locations on said intermediate workpiece 3. To be more specific, the points 22 are palpated on perimeters of the intermediate workpiece 3 at the level of the same plurality of cross sections 21 as for the measurements carried out on the raw workpiece 2.

The processing part 17 includes a processing unit 23 adapted to compare the geometric parameters 6 of the intermediate workpiece 3 and the geometric parameters 8 of the raw workpiece 2. When the measurements have been done on the intermediate workpiece 3, the processing unit 23 carries out this comparison, which makes it possible to determine the deformations 9 that the cross has undergone during the machining operation PROC0.

The processing part 17 also includes processing units 24 adapted to apply data processing techniques to the geometric parameters 6 and 8 and the deformations 9. These processing units 24 are in particular adapted to apply principal component analysis to the measured data, namely the geometric parameters 6 and 8 and the deformations 9. When the measurement and the comparison have been done the processing unit 24 applies said data processing in such a manner as to take into account only the most pertinent data and to determine the geometric profile 7.

The processing part 17 includes the computation units COMP1, COMP2 and COMP3 and the database DATA. They enable execution of the estimation steps E2 and E3 of the method M using the estimation model 10 and the simulation model 13. When the geometric profile 7 has been determined the residual stress field RS in the intermediate workpiece 3 is estimated with the aid of the method M as described above.

The processing part 17 further includes a processing unit 25 adapted to determine from the residual stress field RS the mechanical behavior of the intermediate workpiece 3 during the machining operations PROC1 and PROC2. The processing unit 25 is also able to modify the value of at least one machining parameter 14 of said machining operations PROC1 and PROC2. Once the residual stress field RS has been estimated the processing unit 25 therefore carries out this modification of the value of the machining parameter 14 with the aim of minimizing subsequent deformations of the intermediate workpiece 3 during the machining operations PROC1 and PROC2.

As represented schematically in FIG. 5 in a cross section of the intermediate workpiece 3, the tool 15 is intended to remove material in the upper part 18. In this FIG. 5 there has been represented inside the intermediate workpiece 3 the intended theoretical position of the finished workpiece 5 once all the material has been removed by the remaining machining operations. Also represented are field lines depicting the residual stress field RS in the intermediate workpiece 3 estimated by the method M.

The processing unit 25 is configured to modify the position of the tool 15 to carry out the machining operations PROC1 and PROC2 as a function of these residual stresses. The effect of this modification of the position of the tool 15 is to change its future trajectory during said machining operations PROC1 and PROC2 relative to its initially intended trajectory. Consequently, the theoretical position of the finished workpiece 5 in the section of the intermediate workpiece 3 is also modified. This enables removal of material in zones that are more advantageous than others in terms of potential deformations caused by the machining operations PROC1 and PROC2. In fact, depending on the value of the residual stresses in a given zone of the intermediate workpiece 3, it is possible to tell if it is beneficial or not to remove material in that given zone, and where applicable in what proportion it is preferable to remove material.

When the position of the tool 15 has been modified the machining operations PROC1 and PROC2 are carried out and the finished workpiece 5 is obtained. This finished workpiece 5 then exhibits little deformation and conforms to the required workpiece in terms of geometric tolerances. The required workpiece is therefore obtained without recourse to additional rectification steps.

In the particular example of application described hereinabove the machining process P comprises three machining operations PROC0, PROC1 and PROC2. It is nevertheless possible to adapt it to machining processes including a varied number of machining operations. Likewise, in this application example the method M is used only once during machining, between the machining operations PROC0 and PROC1. In other applications it is nevertheless possible to use the method M more than once during the same machining operation. This can make it possible to verify that the machining has been adjusted correctly and/or to effect a more refined adjustment.

The residual stress field estimation method M as described hereinabove has numerous advantages. In particular:

- it enables estimation of the residual stress field RS in the workpiece 1 without recourse to direct calculation of said residual stresses;
- it enables estimation of the residual stress field RS in the workpiece 1 at a very early stage during machining;
- it may be executed in real time during machining;
- it is easily adapted to varied forms of machining;
- it is simple, fast and of relatively low cost to use.

Moreover, the machining process P as described hereinabove using the method M also has numerous advantages. In particular:

- it enables production of the finished workpiece 5 featuring minimum deformations relative to the required workpiece;
- it enables prevention of deformations of the finished workpiece 5 with a reduced number of machining operations and therefore enables savings in terms of time and machining cost;
- it enables steps of rectification of the finished workpiece 5 that can be long and costly to be avoided; and
- it enables adjustment of varied machining operations.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

Claimed is:

1. A process for machining a raw workpiece to produce a finished workpiece, said process comprising the following steps executed successively:

- an initial measurement step of measuring geometric parameters of the raw workpiece;
- an initial machining step of carrying out at least one initial machining operation on the raw workpiece to obtain a first intermediate workpiece; and
- at least one series of steps comprising at least the following steps executed successively:
- a first processing step of estimating a residual stress field in the first intermediate workpiece using a method for estimating the residual stress field in the first intermediate workpiece during machining, the method comprising the following steps executed successively:

a measurement step of measuring geometric parameters of the first intermediate workpiece at a given moment during machining thereof at which a residual stress field in the first intermediate workpiece is to be known, in such a manner as to determine a geometric profile of the first intermediate workpiece;

a first estimation step of estimating, from the geometric profile and an estimation model, subsequent deformations that the first intermediate workpiece is liable to undergo during further machining, said estimation model being trained beforehand by machine learning on so-called training workpieces in such a manner as to be able to use the geometric profile of the first intermediate workpiece and prerecorded data on the training workpieces to estimate said subsequent deformations of the first intermediate workpiece; and a second estimation step of estimating from the subsequent deformations estimated during the first estimation step and a simulation model, the residual stress field in the first intermediate workpiece, said simulation model being a generic physical model based on simulations defining a variability of the residual stress field in the first intermediate workpiece as a function of manufacturing parameters of the raw workpiece;

the process further comprising the following steps executed successively:

a second processing step of estimating, from the residual stress field in the first intermediate workpiece estimated in the first processing step, a subsequent mechanical behavior of said first intermediate workpiece during subsequent machining operations;

a correction step of modifying the value of at least one machining parameter of said subsequent machining operations as a function of the subsequent mechanical behavior of the first intermediate workpiece estimated in the second processing step to minimize deformations of the first intermediate workpiece during said subsequent machining operations; and, a machining step of carrying out at least one machining operation on the first intermediate workpiece, said machining operation taking into account said modified value of said machining parameter(s) in such a manner as to obtain a second intermediate workpiece.

2. The process as claimed in claim 1, wherein the second intermediate workpiece obtained in the machining step is the finished workpiece to be produced.

3. The process as claimed in claim 1, wherein said series of steps is carried out in an iterative manner and on each iteration the first intermediate workpiece is the second intermediate workpiece of the preceding iteration, said series of steps being repeated until the second intermediate workpiece is the finished workpiece to be produced.

4. The process as claimed in claim 1, wherein the initial machining step comprises a single initial machining operation.

5. The process as claimed in claim 1, wherein the machining parameter or parameters includes:

a position of at least one machining tool;

an orientation of the machining tool or tools;

a position of the first intermediate workpiece to be machined;

an orientation of the first intermediate workpiece to be machined;

a trajectory of the machining tool or tools;

a pass depth of the machining tool or tools;

a cutting speed of the machining tool or tools; or any combination of the foregoing.

6. The process as claimed in claim 1, wherein in the initial measurement step and in the measurement step the geometric parameters are measured with a three-dimensional measuring machine, a three-dimensional scanner, or a combination thereof.

7. A process for machining a raw workpiece to produce a finished workpiece, said process comprising the following steps executed successively:

an initial measurement step of measuring geometric parameters of the raw workpiece;

an initial machining step of carrying out at least one initial machining operation on the raw workpiece to obtain a first intermediate workpiece; and at least one series of steps comprising at least the following steps executed successively:

a first processing step of estimating a residual stress field in the first intermediate workpiece;

a second processing step of estimating, from the residual stress field in the first intermediate workpiece estimated in the first processing step, a subsequent mechanical behavior of said first intermediate workpiece during subsequent machining operations;

a correction step of modifying the value of at least one machining parameter of said subsequent machining operations as a function of the subsequent mechanical behavior of the first intermediate workpiece estimated in the second processing step to minimize deformations of the first intermediate workpiece during said subsequent machining operations; and, a machining step of carrying out at least one machining operation on the first intermediate workpiece, said machining operation taking into account said modified value of said machining parameter(s) in such a manner as to obtain a second intermediate workpiece.

8. The process as claimed in claim 7, wherein the second intermediate workpiece obtained in the machining step is the finished workpiece to be produced.

9. The process as claimed in claim 7, wherein said series of steps is carried out in an iterative manner and on each iteration the first intermediate workpiece is the second intermediate workpiece of the preceding iteration, said series of steps being repeated until the second intermediate workpiece is the finished workpiece to be produced.

10. The process as claimed in claim 7, wherein the initial machining step comprises a single initial machining operation.

11. The process as claimed in claim 7, wherein the machining parameter or parameters includes:

a position of at least one machining tool;

an orientation of the machining tool or tools;

a position of the first intermediate workpiece to be machined;

an orientation of the first intermediate workpiece to be machined;

a trajectory of the machining tool or tools;

a pass depth of the machining tool or tools;

a cutting speed of the machining tool or tools; or any combination of the foregoing.

12. The process as claimed in claim 7, wherein in the initial measurement step, the geometric parameters are measured with a three-dimensional measuring machine, a three-dimensional scanner, or a combination thereof.

13. The process as claimed in claim 7, wherein the first processing step of estimating the residual stress field in the first intermediate workpiece comprises the following steps executed successively:

a measurement step of measuring geometric parameters of the first intermediate workpiece at a given moment during machining thereof at which a residual stress field in the first intermediate workpiece is to be known, in such a manner as to determine a geometric profile of the first intermediate workpiece;

a first estimation step of estimating, from the geometric profile and an estimation model, subsequent deformations that the first intermediate workpiece is liable to undergo during further machining, said estimation model being trained beforehand by machine learning on so-called training workpieces in such a manner as to be able to use the geometric profile of the first intermediate workpiece and prerecorded data on the training workpieces to estimate said subsequent deformations of the first intermediate workpiece; and a second estimation step of estimating from the subsequent deformations estimated during the first estimation step and a simulation model, the residual stress field in the first intermediate workpiece, said simulation model being a generic physical model based on simulations defining a variability of the residual stress field in the first intermediate workpiece as a function of manufacturing parameters of the raw workpiece.

14. The method as claimed in claim 13, wherein during the measurement step a principal component analysis is applied to the measured geometric parameters in such a manner as to reduce a dimension of the geometric profile of the first intermediate workpiece to be determined.

15. The method as claimed in claim 13, wherein the estimation model is trained using a regression method enabling estimation of the subsequent deformations based on data measured on the training workpieces.

16. The method as claimed in claim 13, wherein the geometric profile of the first intermediate workpiece determined in the measurement step is used to enrich the estimation model.

17. The method as claimed in claim 13, wherein the simulation model of the residual stress field is based on finite element simulations and is constructed with a singular value decomposition.

18. The method as claimed in claim 13, wherein the simulation model is configured to define a variability of the residual stress field in the first intermediate workpiece based on manufacturing parameters of the raw workpiece, said raw workpiece having undergone at least one of the following manufacturing operations: forging, heat treatment, cold rolling, machining.

* * * * *